(12) United States Patent
Devedeux et al.

(10) Patent No.: US 12,253,317 B2
(45) Date of Patent: Mar. 18, 2025

(54) HEAT EXCHANGER WITH AN ADDED-ON COLLECTOR

(71) Applicant: Valeo Systemes Thermiques, Le Mesnil Saint-Denis (FR)

(72) Inventors: Sébastien Devedeux, Le Mesnil Saint Denis (FR); Mickael Gameiro, Le Mesnil Saint Denis (FR); Mateusz Lipowski, Skawina (PL)

(73) Assignee: VALEO SYSTEMES THERMIQUES, Le Mesnil Saint-Denis (FR)

( * ) Notice: Subject to any disclaimer, the term of this patent is extended or adjusted under 35 U.S.C. 154(b) by 204 days.

(21) Appl. No.: 17/784,867

(22) PCT Filed: Dec. 11, 2020

(86) PCT No.: PCT/FR2020/052401
§ 371 (c)(1),
(2) Date: Jun. 13, 2022

(87) PCT Pub. No.: WO2021/116630
PCT Pub. Date: Jun. 17, 2021

(65) Prior Publication Data
US 2023/0008850 A1    Jan. 12, 2023

(30) Foreign Application Priority Data
Dec. 13, 2019 (FR) ...................... 1914373

(51) Int. Cl.
*F28F 9/02* (2006.01)
(52) U.S. Cl.
CPC .......... *F28F 9/0219* (2013.01); *F28F 9/0246* (2013.01); *F28F 2009/0297* (2013.01); *F28F 2275/04* (2013.01)

(58) Field of Classification Search
CPC .................. F28F 9/0219; F28F 9/0246; F28F 2009/0297; F28F 2275/04
(Continued)

(56) References Cited

U.S. PATENT DOCUMENTS
2015/0027666 A1    1/2015 Hisanaga et al.

FOREIGN PATENT DOCUMENTS
DE    102005012761 A1 *  9/2006 .......... F02B 29/0462
DE    102014213718 A1    1/2016
(Continued)

OTHER PUBLICATIONS
WO-2009062879-A2 (Bourgoin et al.) (May 22, 2009) (Machine Translation) (Year: 2009).*
(Continued)

*Primary Examiner* — Mahmoud Gimie
(74) *Attorney, Agent, or Firm* — Osha Bergman Watanabe & Burton LLP

(57) ABSTRACT

The present invention relates to a heat exchanger (1) comprising at least one heat exchange bundle (2), a box (4, 6) and a collector (8), the box (4, 6) being arranged at one end (24, 26) of the heat exchange bundle (2), the heat exchange bundle (2) comprising at least one peripheral wall (10) which delimits a housing (18) in which a plurality of tubes (12) extend, inside which tubes a first fluid circulates and around which a second fluid circulates, at least one opening (30) being provided in the peripheral wall (10) and a collector (8) comprising a peripheral edge (40) being arranged so as to cover the opening (30).

12 Claims, 6 Drawing Sheets

(58) Field of Classification Search
USPC .......................................................... 165/158
See application file for complete search history.

(56) References Cited

FOREIGN PATENT DOCUMENTS

| | | | | |
|---|---|---|---|---|
| EP | 3246647 A1 | 11/2017 | | |
| EP | 3567331 A1 | 11/2019 | | |
| FR | 2933176 A1 * | 1/2010 | ........... | F28D 9/0043 |
| GB | 1566029 A | 4/1980 | | |
| WO | WO-2009062879 A2 * | 5/2009 | .......... | F02B 29/0418 |
| WO | 2013022072 A1 | 2/2013 | | |

OTHER PUBLICATIONS

International Search Report and Written Opinion in corresponding International Application No. PCT/FR2020/052401, dated Feb. 26, 2021 (11 pages).

* cited by examiner

HEAT EXCHANGER WITH AN ADDED-ON COLLECTOR

The present invention relates to the field of heat exchangers, and more particularly to rendering a collector which is added onto a heat-exchange bundle integral with a heat exchanger.

A heat exchanger, such as, for example, a charge air cooler, generally comprises a heat-exchange bundle comprising tubes inside which a first fluid circulates. The exchanger also comprises input or output boxes which are positioned on both sides of the heat-exchange bundle, making it possible to direct the first fluid into the plurality of tubes. The heat exchanger also comprises at least one collector which makes it possible to irrigate or discharge a second heat-bearing fluid from the heat-exchange bundle, the second fluid being designed to exchange calories with the first heat-bearing fluid.

During the process for production of the heat exchanger, the collectors are habitually derived from a deformation of a peripheral wall of the heat-exchange bundle, such that said collector and the peripheral wall of the heat-exchange bundle form a single part. However, the applicant observed that this formation of the collector on the peripheral wall gave rise to problems of sealing in the long term, because of the tube becoming fragile at the join with the collector. The sealing problems at the tube-collector join then have the effect of creating leakages of the second fluid towards the first fluid, thus giving rise to breakdown of the vehicle equipped with this heat exchanger.

The tube-collector joining area becomes fragile in particular because of the concentration of stress between the collector and the tubes of the bundle when the exchanger is subjected to mechanical stresses, in particular when thermal shocks are sustained. The concentrations of stress are derived mainly from the variation of thickness between the collector and the tubes, with the tubes being thinner than the collector. At this joining (or separation) area, a wedge or a notch will be formed, which creates concentrations of stress when the exchanger is subjected to mechanical stresses. The stresses can be purely of a mechanical type, or they can be thermal, or also thermo-mechanical.

The objective of the present invention is thus to eliminate the aforementioned disadvantages, by designing a collector, the sealing of which with the heat-exchange bundle is improved, and thus makes it possible to increase the reliability and service life of the heat exchanger.

The invention thus relates to a heat exchanger comprising at least one heat-exchange bundle, a box and a collector, the box being positioned at an end of the heat-exchange bundle, the heat-exchange bundle comprising at least one peripheral wall which delimits a receptacle in which there extends a plurality of tubes within which a first fluid circulates, and around which a second fluid circulates, at least one opening being provided in the peripheral wall, the heat exchanger being characterized in that the collector is added onto the peripheral wall, the collector delimiting a chamber at least partly, and comprising a peripheral edge which surrounds a window of the collector, the collector being positioned so as to cover the opening provided in the peripheral wall, such that the window is at least partly in line with the opening, and the peripheral edge is at least partly in contact with said peripheral wall.

The heat exchanger is a device allowing exchanges of calories between two fluids without the fluids mixing. In the context of the invention, this heat exchanger may in particular be a charge air cooler, the function of which is to cool the air coming from a turbocharger before it is input into an internal combustion engine.

The heat exchanger thus comprises an input box which makes it possible to direct the air output from the turbocharger, in this case the first fluid, to the heat-exchange bundle, and an output box making it possible to direct the air output from the heat-exchange bundle to the internal combustion engine. More specifically, the input box and the output box are connected to the plurality of tubes provided in the receptacle of the heat-exchange bundle, such that the input box and/or the output box and the plurality of tubes are in fluid communication with one another.

The function of the collector is to direct the second fluid in the receptacle of the heat-exchange bundle, between the plurality of tubes. Thus, the opening provided in the peripheral wall of the heat-exchange bundle is a through-opening, i.e. it is open on the receptacle of the heat-exchange bundle. Advantageously, the window of the collector is strictly in line with the opening, and it is thus understood that the collector, the chamber of which is positioned covering the opening, permits the circulation of the second fluid between the collector and the receptacle of the heat-exchange bundle. Advantage is thus derived from the peripheral edge which extends against the peripheral wall of the heat-exchange bundle, making it possible to ensure optimal sealing between the collector and the heat-exchange bundle.

It is also understood that the peripheral edge which is added onto the heat exchanger makes it possible to increase the thickness of said heat exchanger at the join between the collector and the heat-exchange bundle. This therefore reduces the risks of damage to this area caused by the thermal shocks between the first fluid and the second fluid.

According to a characteristic of the invention, the peripheral wall of the heat-exchange bundle comprises an inner face which faces towards the receptacle, and an outer face which faces towards the environment on the exterior of the heat-exchange bundle, the peripheral edge of the collector being in contact with the outer face of the peripheral wall.

According to a characteristic of the invention, the plurality of tubes extends longitudinally in the receptacle which is delimited by the peripheral wall, the opening being provided transversely to the plurality of tubes.

According to an example of the invention, the tubes are arranged in series in a transverse direction of the heat exchanger, perpendicularly to the longitudinal direction in which they extend. The opening is thus provided in the peripheral wall, perpendicularly to the plurality of tubes, in the receptacle of the heat-exchange bundle.

Advantage is derived from a configuration of this type in that it allows the opening to cover all of the tubes accommodated in the receptacle of the heat-exchange bundle, and thus to homogenize the circulation of the second fluid around the tubes.

According to a characteristic of the invention, the window of the collector and the opening provided in the peripheral wall are aligned on the same transverse axis, and a width of the window is larger than a width of the opening.

The width of the window and the width of the opening are measured along a straight line perpendicular to the transverse axis on which the opening and the window are aligned. It is understood from this particular structural characteristic that the peripheral edge does not encroach on the opening. In other words, during use of the heat exchanger, the peripheral edge of the collector is not interposed on the path of the second fluid when the fluid passes through the opening.

According to a characteristic of the invention, the chamber has a first end of the collector which extends over a first height measured along a plane of symmetry of the chamber, and a second end of the collector which extends over a second height measured along the plane of symmetry, the first height being greater than the second height. The first end is the one via which the second fluid enters into the chamber of the collector.

It is understood from this characteristic of the invention that the volume of the chamber is greater at the first end than the volume of the chamber at the second end of the collector.

During operation of the heat exchanger, the height of the chamber is adapted to the flow rate of the second fluid, according to its position along the second fluid second fluid chamber.

Thus, the decrease in the height of the chamber of the collector is for example proportional to the decrease in the flow rate of the second fluid in the chamber of the collector. Advantage is derived from this characteristic in that it makes it possible to obtain homogeneousness of supply of the heat-exchange bundle along its second fluid width. Thus, the distribution of the second fluid in the receptacle is balanced, and makes it possible to optimize the heat exchanges between the first fluid and the second fluid.

According to a characteristic of the invention, the opening comprises a first border which extends in the longitudinal direction of the heat-exchange bundle over a first distance, and a second border which extends in the longitudinal direction of the heat-exchange bundle over a second distance, the second distance being equal to the first distance.

According to an alternative of the invention, the opening comprises a first border which extends in the longitudinal direction of the heat-exchange bundle over a first distance, and a second border which extends in the longitudinal direction of the heat-exchange bundle over a second distance, the second distance being strictly shorter or also strictly longer than the first distance.

During the operation of the heat exchanger, when the second fluid is circulating in the chamber of the collector in a direction of circulation going from the second border of the opening towards the first border of the opening, it is understood that the flow rate of the second fluid in the chamber is greater at the second border than at the first border, with part of the second fluid having already passed through the opening. Thus, advantageously, the longitudinal distance along which the opening extends can be inversely proportional to the flow rate of the second fluid in the chamber of the collector.

Advantage is derived from this characteristic in that it makes it possible to homogenize he distribution of the second fluid in the receptacle of the heat-exchange bundle, and thus to optimize the heat exchanges between the first fluid and the second fluid.

According to a characteristic of the invention, at least one rib extends into the opening. A rib of this type is provided by the material of the peripheral wall of the heat-exchange bundle.

More specifically, the at least one rib extends in the opening in the longitudinal direction of the heat-exchange bundle.

According to a characteristic of the invention, the at least one rib is provided in line with at least one of the tubes of the plurality of tubes of the heat-exchange bundle.

The rib then has the function of protecting the tube during operation of the heat exchanger, in particular during the distribution of the second fluid from the collector to the receptacle of said heat-exchange bundle, as well as protecting it against thermal shocks. Advantageously, there are as many ribs provided in the opening as there are tubes in the heat-exchange bundle. There can therefore be a plurality of tubes and ribs.

According to a characteristic of the invention, a section of the rib has a form complementary to a portion of the tube Advantage is derived from a characteristic of this type in that it reinforces the retention of the tube in the receptacle of the heat-exchange bundle, in particular during the passage of the second fluid through the opening. The tube is thus wedged by the rib.

According to a characteristic of the invention, the peripheral edge and the peripheral wall are rendered integral with one another by brazing. Rendering integral of this type of the peripheral edge on the peripheral wall ensures optimal sealing between the collector and the heat-exchange bundle. This therefore increases the service life of the heat exchanger by doubling increasing the thickness of wall in a location of the heat exchanger which is subjected to substantial stresses.

According to a characteristic of the heat exchanger, the heat-exchange bundle comprises a first longitudinal end and a second longitudinal end which are opposite one another in the longitudinal direction of the heat-exchange bundle, the input box being positioned at the first longitudinal end and the output box being positioned at the second longitudinal end, the heat-exchange bundle also comprising a first opening which is provided in a first longitudinal wall of the peripheral wall, and a second opening which is provided on a second longitudinal wall of the peripheral wall, a first collector being positioned such as to cover the first opening and a second collector being positioned such as to cover the second opening.

It should be considered that the first opening, the second opening, the first collector and the second collector are all in conformity with the invention as described above.

Each of the first collector and the second collector is thus connected to a circulation duct allowing one to distribute the second fluid and the other to discharge the second fluid, each from their chamber. It is thus understood that the second fluid is initially distributed in the chamber of the first collector by its circulation duct, and then passes through the first opening in order to circulate in the receptacle defined by the peripheral wall of the heat-exchange bundle, and then passes through the second opening, in order to be discharged from the chamber of the second collector by means of its circulation duct. This therefore permits the calorific exchanges between the first fluid circulating in the plurality of tubes, and the second fluid circulating around the tubes, between the first collector and the second collector.

It will be noted that the first fluid is a gaseous mixture, whereas the second fluid is a heat-bearing liquid, for example a glycoled water.

Other characteristics, details and advantages of the invention will become more apparent from reading the following description on the one hand, and from a plurality of embodiments provided by way of non-limiting indication with reference to the appended schematic drawings on the other hand, in which.

The characteristics, variants and different embodiments of the invention may be associated with one another, in various combinations, as long as they are not mutually incompatible or mutually exclusive. It will be possible, in particular, to conceive of variants of the invention that comprise only a selection of the characteristics described below, in isolation from the other characteristics described, if this selection of characteristics is sufficient to confer a technical advantage or to distinguish the invention from the prior art.

In the figures, elements common to several figures keep the same reference sign.

Figure 1:
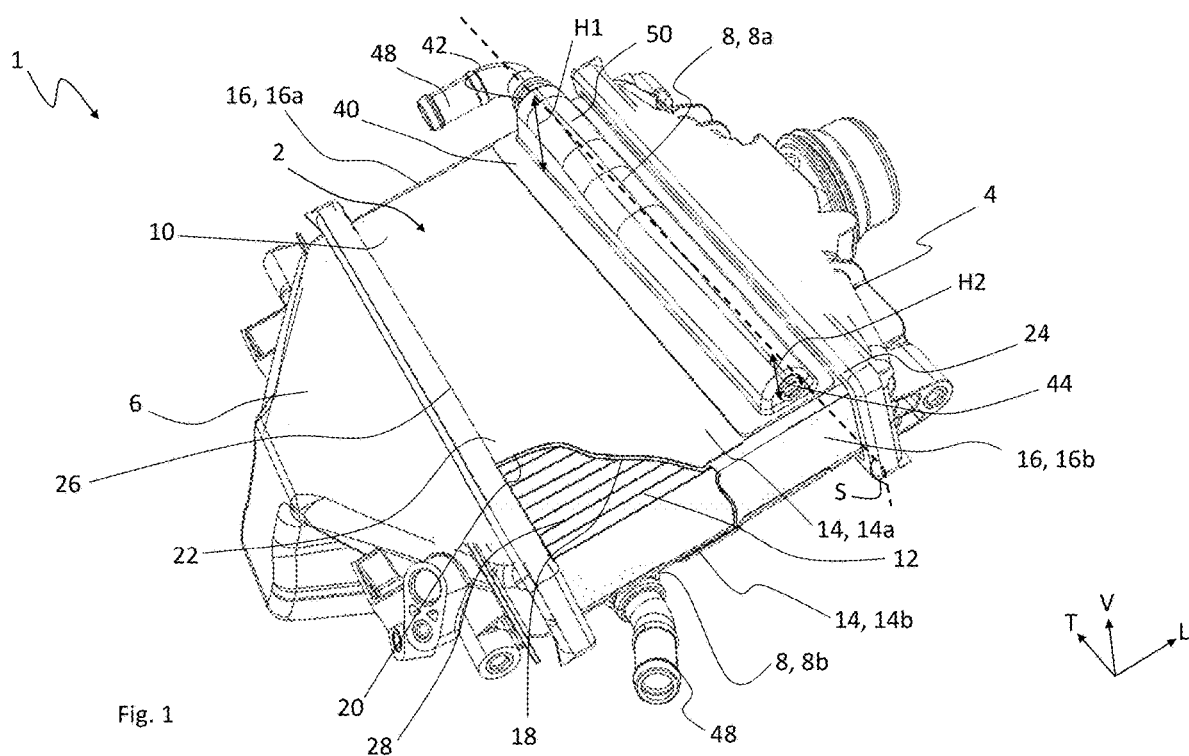
FIG. 1 is a general view in perspective of a heat exchanger according to the invention comprising a heat-exchange bundle and a collector added onto the heat-exchange bundle.

FIG. 1 illustrates a heat exchanger 1 according to the invention. The heat exchanger 1, for example a charge air cooler, is composed of at least one heat-exchange bundle 2, an input box 4, an output box 6, and at least one collector 8.

The heat-exchange bundle 2 extends in a main direction of extension, or longitudinal direction L, and comprises at least one peripheral wall 10 and a plurality of tubes 12. The peripheral wall 10 is in the form of a quadrilateral defined by two longitudinal walls 14 and two lateral walls 16. More specifically, the peripheral wall 10 comprises a first lateral wall 16a and a second lateral wall 16b which extend parallel to one another and opposite one another in a transverse direction T which is perpendicular to the longitudinal direction L of the heat-exchange bundle 2, and a first longitudinal wall 14a and a second longitudinal wall 14b which extend parallel to one another and opposite one another in a vertical direction V perpendicular to the longitudinal direction L and transverse direction T of the heat-exchange bundle 2, such that they connect the lateral walls 16.

The peripheral wall 10 of the heat-exchange bundle 2 defines a receptacle 18 in which the plurality of tubes 12 extends. More specifically, the receptacle 18 is defined by an inner face 20 of the peripheral wall 10, and an outer face 22, opposite the inner face 20 of the peripheral wall 10, and corresponds to the face of the peripheral wall 10 which faces opposite the space occupied by the heat-exchange bundle 2.

The tubes 12 extend in the receptacle 18 of the heat-exchange bundle 2 in the longitudinal direction L thereof. More specifically, the tubes 12 of the plurality of tubes extend between a first longitudinal end 24 of the heat-exchange bundle 2 and a second longitudinal end 26 of the heat-exchange bundle 2, opposite the first longitudinal end 24 in the longitudinal direction L of the heat-exchange bundle 2. As can be seen partly in FIG. 1, the plurality of tubes 12 is arranged in the receptacle 18 in rows of tubes 12 in the transverse direction T of the heat-exchange bundle 2, while being spaced from one another, such that a space 28 is provided between each of the tubes 12 of the plurality of tubes 12. The tubes 12 of the plurality of tubes 12 are tubes which are rolled or obtained from rendering two plates integral.

The input box 4 is positioned at the first longitudinal end 24 of the heat-exchange bundle 2, whereas the output box 6 is positioned at the second longitudinal end 26 of the heat-exchange bundle 2. The input box 4 and the output box 6 are thus each connected to one end of each of the tubes 12 of the plurality of tubes 12, respectively at the first longitudinal end 24 and the second longitudinal end 26 of the heat-exchange bundle 2. In other words, the plurality of tubes 12 is in fluid communication with the input box 4 and the output box 6.

The input box 4 thus has the function of directing a first fluid towards the heat-exchange bundle 2, and in particular in the plurality of tubes 12. It is thus understood that the first fluid, for example a flow of charge air of an internal combustion engine, circulates between the input box 4 and the output box 6, passing through each of the tubes 12 of the plurality of tubes 12 of the heat-exchange bundle 2.

In the receptacle 18, and more specifically in the space 28 provided between the tubes 12, a second fluid circulates. The second fluid can in particular be a heat-bearing fluid designed to exchange calories with the first fluid which circulates in the plurality of tubes 12. A first collector 8a and a second collector 8b are thus positioned respectively on the first longitudinal wall 14a and the second longitudinal part 14b of the peripheral wall 10 of the heat-exchange bundle 2. More specifically, the first collector 8a and the second collector 8b are positioned such as to cover a first opening 30a and a second opening 30b shown in FIGS. 2 and 4, in contact with the peripheral wall 10. The openings 30a and 30b are wedging areas between the tubes 12 and the collectors 8a and 8b. These are areas of high mechanical stresses, in particular as far as thermal shock is concerned.

Figure 2:
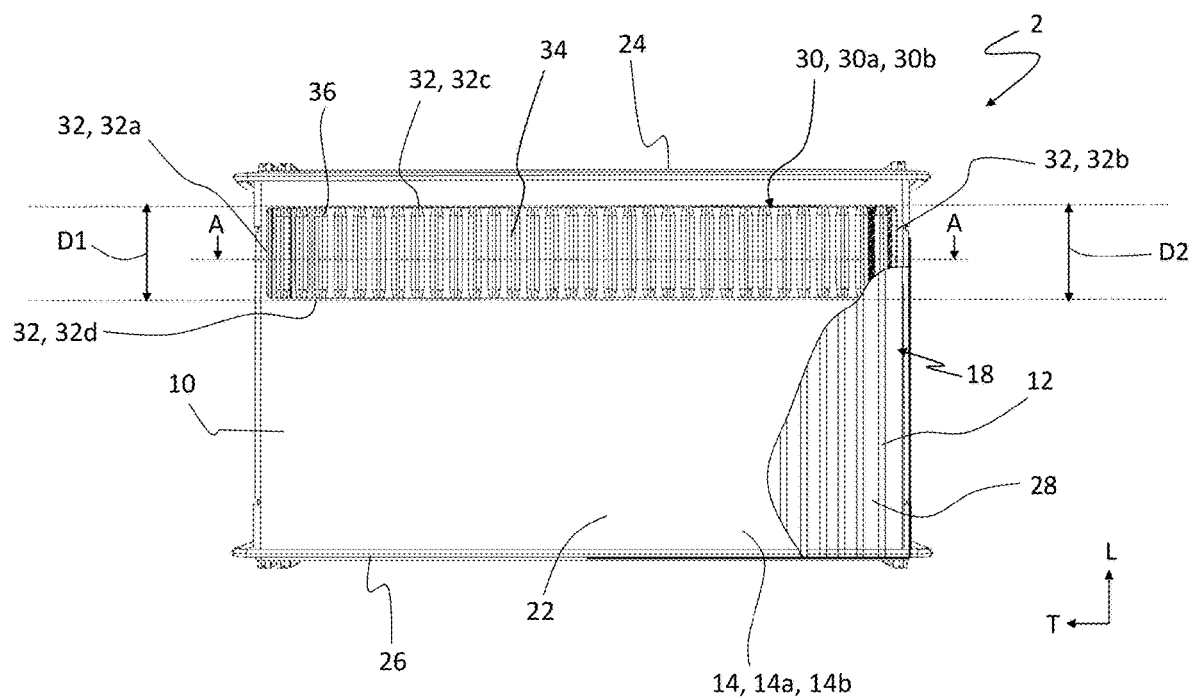
FIG. 2 is a general view in perspective of the heat-exchange bundle in FIG. 1, comprising a peripheral wall in which an opening according to a first embodiment of the invention is provided.

Hereinafter in the description, only the characteristics of the first collector 8a and the first opening 30a will be described in detail, but it is understood that these characteristics can apply mutatis mutandis to the second collector 8b and the second opening 30b. Thus, hereinafter in the description, the first collector 8a and the second collector 8b will be grouped together under the term "collector 8", when the characteristics apply to one or the other of the first collector 8a and the second collector 8b. Similarly, the first opening 30a and the second opening 30b will be grouped together under the term "opening 30", when the characteristics apply to one or the other of the first opening 30a or the second opening 30b. FIG. 2 illustrates the opening 30 provided in one of the longitudinal walls 14 of the peripheral wall 10 of the heat-exchange bundle 2. It is understood that the opening 30 is a through-opening, i.e. it is open in the receptacle 18 of the heat-exchange bundle 2.

According to the invention, the opening 30 extends transversely in the longitudinal wall 14 of the peripheral wall 10, relative to the plurality of tubes 12 which extend longitudinally in the receptacle 18 of the heat-exchange bundle 2. In other words, the opening 30 extends in the longitudinal wall 14 of the peripheral wall 10, perpendicularly to the plurality of tubes 12.

As previously described, the plurality of tubes 12 is arranged in series and transversely in the receptacle 18, and it is thus understood that, advantageously, the opening 30 extends transversely, such that it is facing each of the tubes 12 of the plurality of tubes 12. Thus, homogeneous irrigation of the second fluid is ensured in the receptacle 18, and more particularly in the space 28 formed between each of the tubes 12.

The opening 30 is delimited by borders 32 of the longitudinal wall 14. More specifically, a first border 32a and a second border 32b both extend in the longitudinal direction L of the heat-exchange bundle 2, whereas a third border 32c and a fourth border 32d extend in the transverse direction T of the heat exchanger 2, and such that they connect the first border 32a and the second border 32b. A first distance D1 is defined as the distance taken in the longitudinal direction L of the heat-exchange bundle 2 over which the first border 32a extends, and a second distance D2 is defined as the distance taken in the longitudinal direction L of the heat-exchange bundle 2 over which the second border 32b extends. According to the first embodiment of the opening 30, the first distance D1 is equal to the second distance D2.

According to a characteristic of the invention, at least one rib 34 extends in the opening 30. According to the example illustrated of the invention, a plurality of ribs 34 extends in the opening 30 in the longitudinal direction L of the heat-exchange bundle 2. It is thus understood that each of the ribs 34 extends in the opening 30, between the third border 32c and the fourth border 32d of said opening 30. The rib(s) 34 is/are portions of the peripheral wall 10, and form(s) strips which pass through the opening from one longitudinal edge to the other.

Each of the ribs 34 of the plurality of ribs 34 is thus spaced from an adjacent rib 34, such that the particular arrangement of the ribs 34 in the opening 30 forms slots 36. It is thus understood that the second fluid passes through the opening 30 at the slots 36 provided therein by the plurality of ribs 34.

Figure 3:
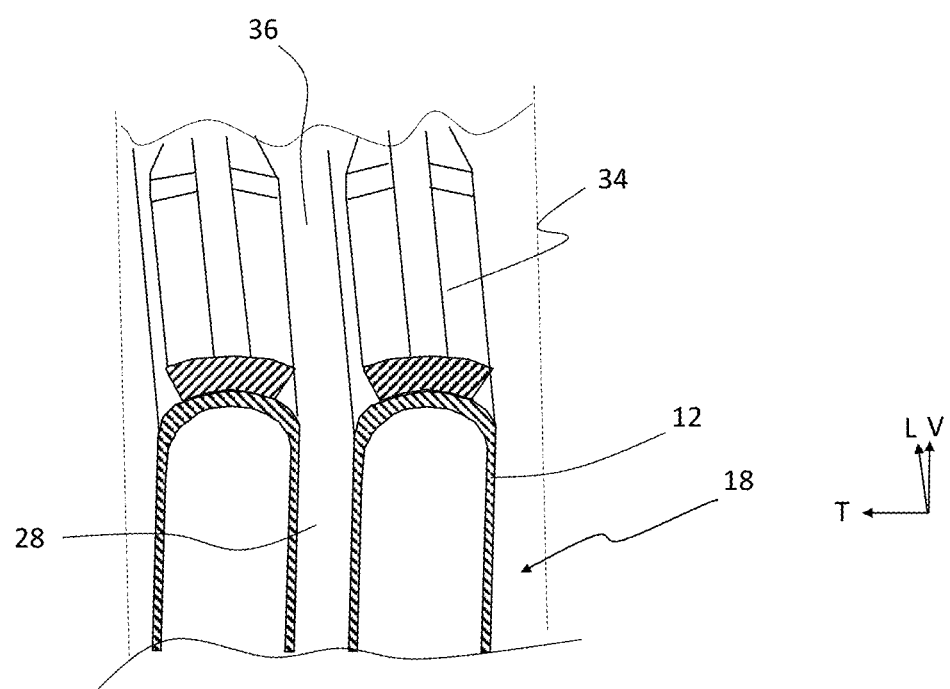
FIG. 3 is a view in cross-section, according to a vertical plane, of the opening in FIG. 2, and comprising at least one rib which cooperates with a tube of the heat-exchange bundle.

According to a characteristic of the invention, which can be seen in particular in FIG. 3, showing a view in cross-section of the opening 30 according to a first vertical plane A-A shown in FIG. 2, at least one rib 34 extends in the opening 30, in line with one of the tubes 12 of the plurality of tubes 12. In the example illustrated, each of the ribs 34 of the plurality of ribs 34 extends in line with one of the tubes 12 of the plurality of tubes 12. The rib 34a thus has the function of protecting the tube 12 during use of the heat exchanger 2, i.e. during circulation of the first fluid and in particular of the second fluid. It is thus understood that, advantageously, there are as many ribs 34 provided in the opening 30 as there are tubes 12 which extend in the receptacle 18 of the heat-exchange bundle 2.

Again according to the invention, at least one section of rib 34 has a form which is complementary to a portion of one of the tubes 12 of the plurality of tubes 12. In other words, the rib 34 is provided such that it can cooperate with a portion of the tube 12. This therefore guarantees that the rib 34 remains in line with the tube 12 during use of the heat exchanger 2, i.e. during the passage of the second fluid in the opening 30.

Figure 4:
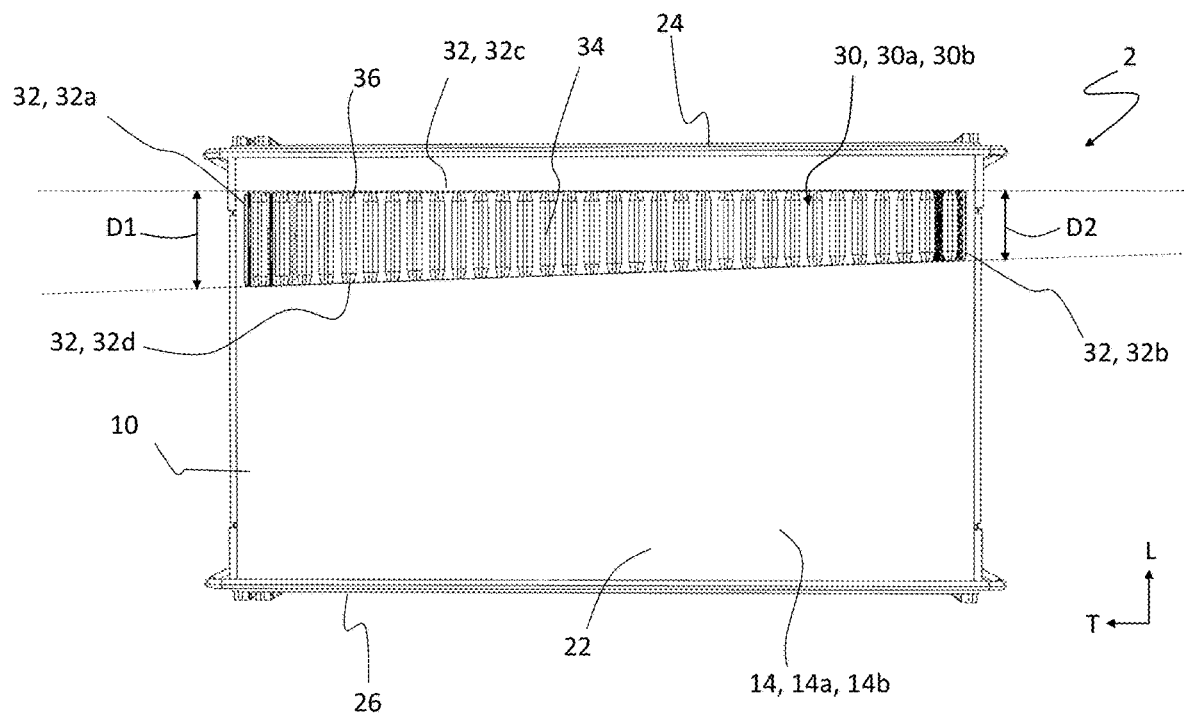
FIG. 4 is a general view in perspective of the heat-exchange bundle in FIG. 1 comprising the peripheral wall in which the opening according to a second embodiment of the invention is provided.

According to a second embodiment of the opening 30 shown in FIG. 4, the second distance D2 of the second border 32b is strictly shorter than the first distance D1 of the first border 32a. It is thus understood that the opening 30 provided in the longitudinal wall 14 extends from the first border 32b, such that the third border 32c and the fourth border 32d are increasingly distant from one another as the first border 32a approaches the opening 30. Thus, each of the ribs 34 provided in the opening 30 extends in the longitudinal direction L of the heat-exchange bundle 2, over an increasing distance, as it approaches the first border 32a of the opening 30.

Advantage is derived from this characteristic during use of the heat exchanger, when the input of the second fluid into the receptacle 18 takes place at the second border 32b of the opening 30. In fact, it is understood that, during the distribution of the second fluid into the receptacle 18, the flow rate of the second fluid in the chamber 38 of the collector 8 is greater at the second border 32b compared with the flow rate of the second fluid when it reaches the first border 32a, with part of the fluid already having passed through the opening 30. It is thus understood that the longitudinal distance over which the opening 30 extends is in inverse proportion to the flow rate of the second fluid in the chamber 38 of the collector 8.

Thus, the enlargement of the opening 30 going from the second border 32b to the first border 32a has the effect of distributing the second fluid better in the receptacle 18 of the heat-exchange bundle 2, by decreasing the volume of a chamber 38 delimited by the collector 8 where the flow rate of the second fluid is greater, and by enlarging the volume of the chamber 38 of the collector 8 where the flow rate of the second fluid is lesser.

Figure 5:
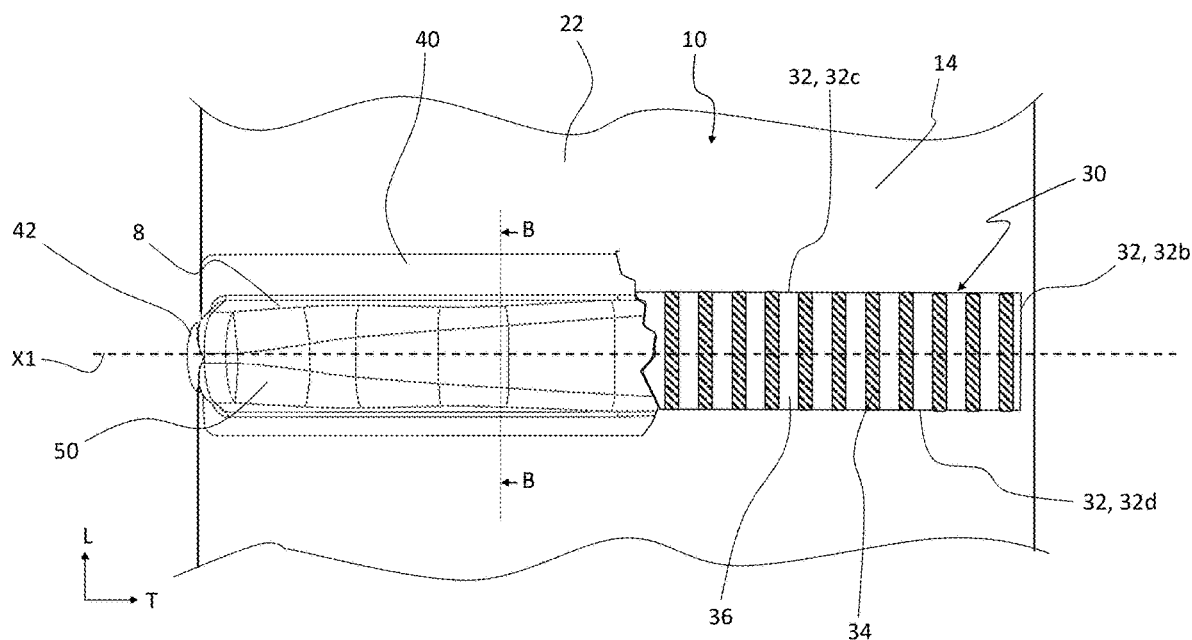
FIG. 5 is a close-up view of the opening in FIG. 2 covered by the collector.
Figure 6:
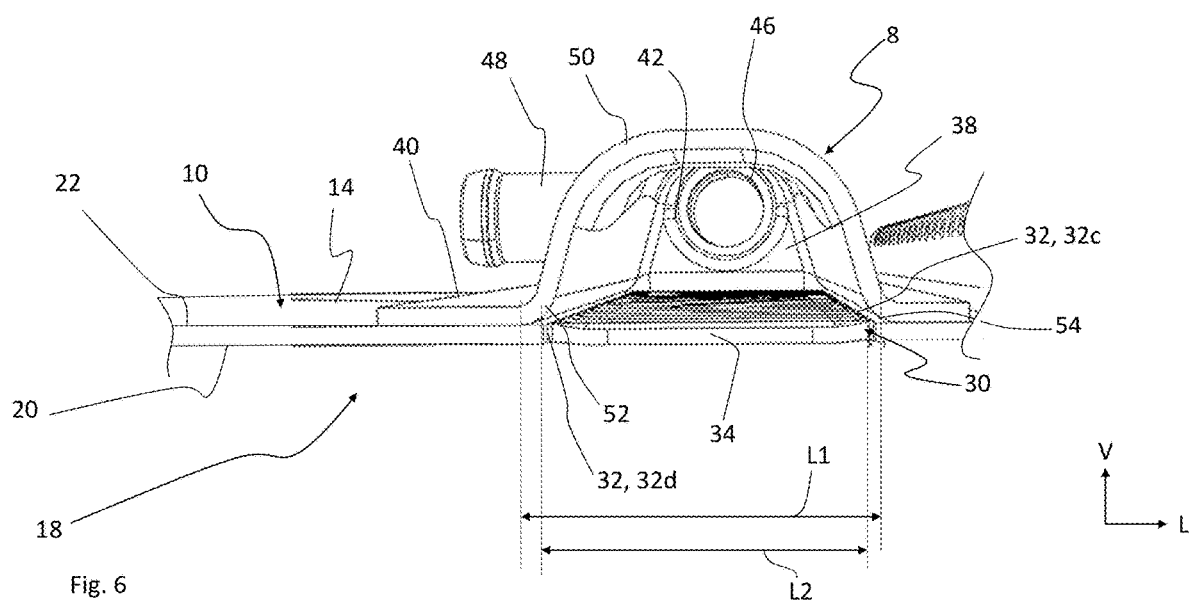
FIG. 6 is a view in cross-section, according to a vertical plane, of the heat-exchange bundle at the opening covered by the collector.

The collector 8 will now be described in cooperation with FIGS. 1, 5 and 6, with FIG. 6 illustrating a view in cross-section of the heat-exchange bundle 2 at the opening 30, according to a second vertical plane B-B shown in FIG. 5.

The collector 8 according to the invention comprises at least one chamber 38 and a peripheral edge 40, and is positioned such as to cover the opening 30 previously described. The collector 8 thus has the function of distributing second fluid to receptacle 18 of the heat-exchange bundle 2 or discharging it therefrom. This therefore defines an input end 42 and an output end 44 of the collector 8, opposite one another on the collector 8, in the transverse direction T of the heat-exchange bundle 2.

According to the example illustrated and shown in FIG. 6, an input orifice 46 is provided at the first end 42 of the collector 8, and a circulation duct 48 is rendered integral around the input orifice 46. It is thus understood that the collector 8 and the circulation duct 48 are in fluid communication with one another.

Alternatively, an output orifice can be provided at the second end 44 of the collector 8, in order for the circulation duct 48 to be rendered integral around said output orifice.

The chamber 38 of the collector 8 is delimited by a chamber wall 50 which has a curved form, and provides the chamber 38 with a cross-section with a concave form. The peripheral edge 40 thus extends from a free edge 52 of the chamber wall 50, and such that the peripheral edge 40 surrounds a window 54 of the chamber 38 of the collector 8. "Window" 54 means the fact that this opens the collector 8 onto an exterior volume, to the volume defined by the chamber 38 of said collector 8.

According to the invention, the collector 8 is positioned such as to cover the opening 30, so that the window 54 of the chamber 38 is in line with the opening 30, and the peripheral edge 40 comes into contact with a part of the outer face 22 of the peripheral wall 10 of the heat-exchange bundle 2. In other words, the window 54 is positioned facing the opening 30, such that the chamber 38 and the receptacle 18 are in fluid communication with one another.

More specifically, an axis of alignment X1, shown in FIG. 5 is defined, on which the chamber 38 of the collector 8 and the opening 30 are aligned. A width of window L1 is defined as the width of the window 54 taken along a straight line perpendicular to the axis of alignment X1 and parallel to the longitudinal direction L of the heat-exchange bundle 2, and a width of the opening L2 is defined as the width of the opening 30 taken along a line perpendicular to the axis of alignment X1 and parallel to the longitudinal direction L of the heat-exchange bundle 2. The width of the window L1 is thus strictly greater than the width of the opening L2. It is thus understood that the peripheral edge 40 does not extend facing the opening 30 provided in the peripheral wall 10. In other words, during the operation of the heat exchanger, the peripheral edge 40 of the collector 8 is not in interaction with the second fluid circulating between the collector 8 and the receptacle 18.

The peripheral edge 10 extends parallel to the longitudinal wall 14 of the peripheral wall 10, such that it is in continuous contact therewith. This therefore ensures continuous sealing between the peripheral edge 40 and the peripheral wall 10, and leakages of the second fluid from the collector 8 and the receptacle 18 are avoided. According to a non-limiting example of the invention, the peripheral edge 40 and the peripheral wall 10 are brazed to one another, such that securing and optimal sealing of the peripheral edge 40 with the peripheral wall 10 is ensured.

As can be seen in particular in FIG. 1, the chamber 38 of the collector 8 has a plane of symmetry S. This therefore defines a first height H1 of the collector 8 taken at the first end 42 of the collector 8 along the plane of symmetry S, and a second height H2 of the collector 8 taken at the second end 44 of the collector 8. According to the invention, the first height H1 is greater than the second height H2.

Advantage is derived from a characteristic of this type, in that it makes it possible to direct the second fluid and concentrate it at the second end 44 of the collector 8. More specifically, when the second fluid enters the chamber 38 of the collector 8 via the circulation duct 48 provided at the first end 42, it is understood that its flow rate is greater at the first end 42 than at the second end 44 of the collector 8. Thus, by reducing progressively the height of the collector 8 and thus of the chamber 38 from the first end 42 to the second end 44, the volume of the chamber 38 is reduced, and a constant flow rate of second fluid is thus maintained in the entire said chamber 38. This therefore permits homogeneous distribution of the second fluid in all of the receptacle 18 of the heat-exchange bundle 2.

As previously described, the first opening 30a is provided in the first longitudinal wall 14a, and the second opening 30b is provided in the second longitudinal wall 14b of the peripheral wall 10. More specifically, the first opening 30a is provided at the first longitudinal end 24, and the second opening 30b is provided at the second longitudinal end 26 of the heat-exchange bundle 2. The first collector 30a is thus defined as the input collector of the second fluid in the heat-exchange bundle 2, and the second collector 30b is defined as the output collector of the second fluid from the heat-exchange bundle 2.

When the heat exchanger 1 is functioning, the second fluid reaches the chamber 38 of the input collector 30a by means of the circulation duct 48, it then passes through the first opening 30a, facing which the window 54 of the chamber 38 of the input collector 30a is positioned, it then passes through the receptacle 18, and in particular the space 28 provided between each of the tubes 12, in order then to be collected in the chamber 38 of the output collector 30b, and be discharged from the heat exchanger 1 by means of the circulation duct 48 of the output collector 30b.

It is thus understood that the circulation of the second fluid as has just been described allows the fluid to exchange calories with the first fluid which circulates between the input box 4 and the output box 6, in the plurality of tubes 12 of the heat-exchange bundle 2.

The invention achieves well the objective which had been set out for it, by conceiving of a simple means for reducing the problems of breakages between the collector and the heat-exchange bundle, by proposing a collector which is added onto the heat-exchange bundle, comprising a peripheral edge which is rendered integral with said heat-exchange bundle.

However, the invention should not be limited to the means and configurations exclusively described and illustrated, and it also applies to all equivalent means or configurations, and to any combination of such means or configurations.

The invention claimed is:

1. A heat exchanger comprising:
   at least one heat-exchange bundle;
   a plurality of ribs;
   a box; and
   a collector,
   the box being positioned at an end of the heat-exchange bundle,
   the heat-exchange bundle comprising at least one peripheral wall which delimits a receptacle in which there extends a plurality of tubes within which a first fluid circulates, and around which a second fluid circulates, at least one opening being provided in the peripheral wall,
   wherein the collector is added onto the peripheral wall, the collector delimiting a chamber at least partly, and comprising a peripheral edge which surrounds a window of the collector,
   the collector being positioned so as to cover the opening provided in the peripheral wall, such that the window is at least partly in line with the opening, and the peripheral edge is at least partly in contact with said peripheral wall,
   wherein at least one rib of the plurality of ribs extends into the opening.

2. The heat exchanger as claimed in claim 1, wherein the peripheral wall of the heat-exchange bundle comprises an inner face which faces towards the receptacle, and an outer face which faces towards the environment on the exterior of the heat-exchange bundle, the peripheral edge of the collector being in contact with the outer face of the peripheral wall.

3. The heat exchanger as claimed in claim 1, wherein the plurality of tubes extends longitudinally in the receptacle which is delimited by the peripheral wall, the opening being provided transversely to the plurality of tubes.

4. The heat exchanger as claimed in claim 1, wherein the window of the collector and the opening provided in the peripheral wall are aligned on the same transverse axis, and a width of the window is larger than a width of the opening.

5. The heat exchanger as claimed in claim 1, wherein the chamber has a first end of the collector which extends over a first height measured along a plane of symmetry of the chamber, and a second end of the collector which extends over a second height measured along the plane of symmetry, the first height being greater than the second height.

6. The heat exchanger as claimed in claim 1, wherein the opening comprises a first border which extends in the longitudinal direction of the heat-exchange bundle over a first distance, and a second border which extends in the longitudinal direction of the heat-exchange bundle over a second distance, the second distance being equal to the first distance.

7. The heat exchanger as claimed in claim 1, wherein the opening comprises a first border which extends in the longitudinal direction of the heat-exchange bundle over a first distance, and a second border which extends in the longitudinal direction of the heat-exchange bundle over a second distance, the second distance being strictly shorter than the first distance.

8. The heat exchanger as claimed in claim 1, wherein at least one rib of the plurality of ribs is provided in line with at least one of the tubes of the plurality of tubes of the heat-exchange bundle.

9. The heat exchanger as claimed in claim 1, wherein the peripheral edge and the peripheral wall are rendered integral with one another by brazing.

10. The heat exchanger as claimed in claim 1, wherein a number of ribs in the plurality of ribs is equal to a number of tubes in the plurality of tubes.

11. The heat exchanger as claimed in claim 1, wherein a spacing between ribs in the plurality of ribs forms a plurality of slots.

12. The heat exchanger as claimed in claim 11, wherein the second fluid passes through the plurality of slots.

\* \* \* \* \*